March 25, 1952     U. K. HENSCHKE ET AL     2,590,101
TACHISTOSCOPE
Filed April 18, 1949     3 Sheets-Sheet 1
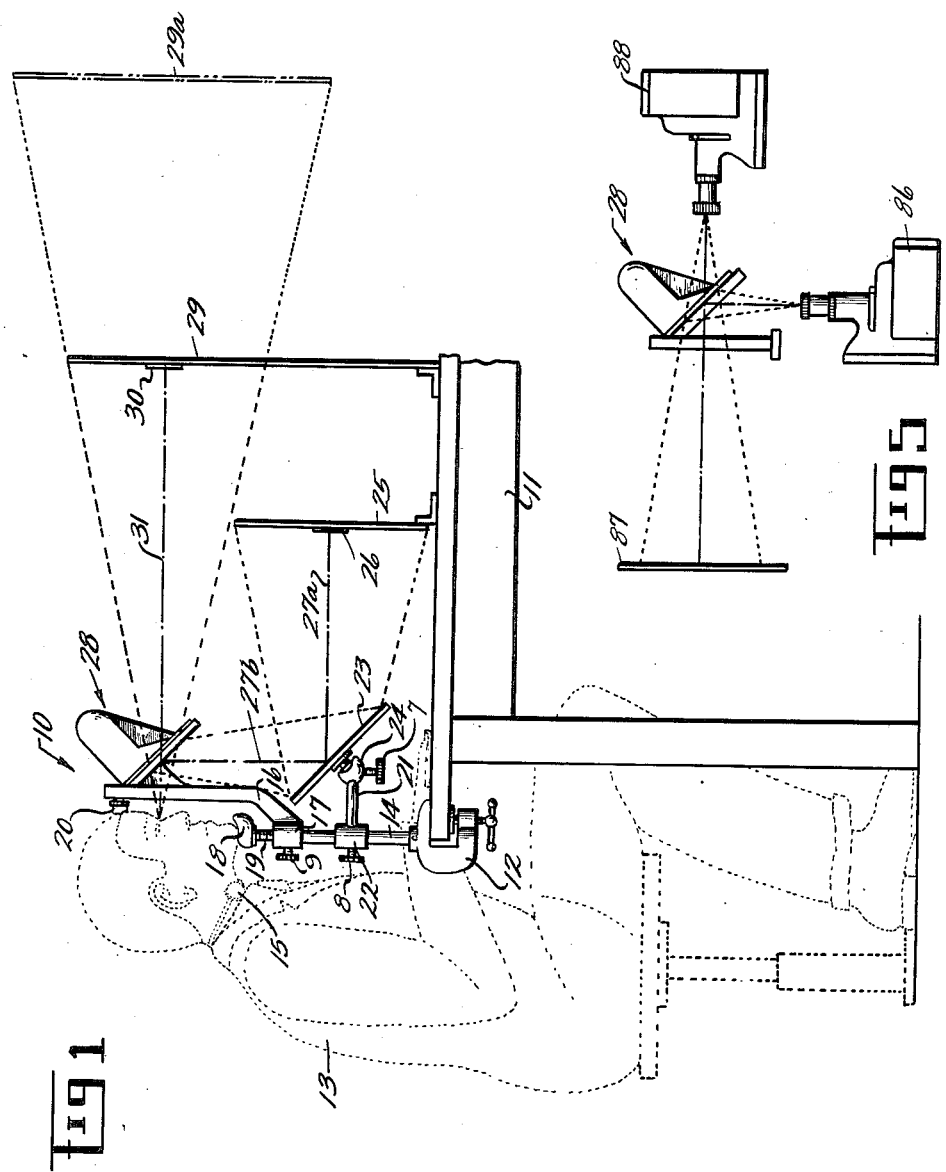
INVENTORS
ULRICH K. HENSCHKE
HANS A. MAUCH
BY
Wade Rooty
Chester Tiefig
ATTORNEYS March 25, 1952     U. K. HENSCHKE ET AL     2,590,101
TACHISTOSCOPE
Filed April 18, 1949     3 Sheets-Sheet 2
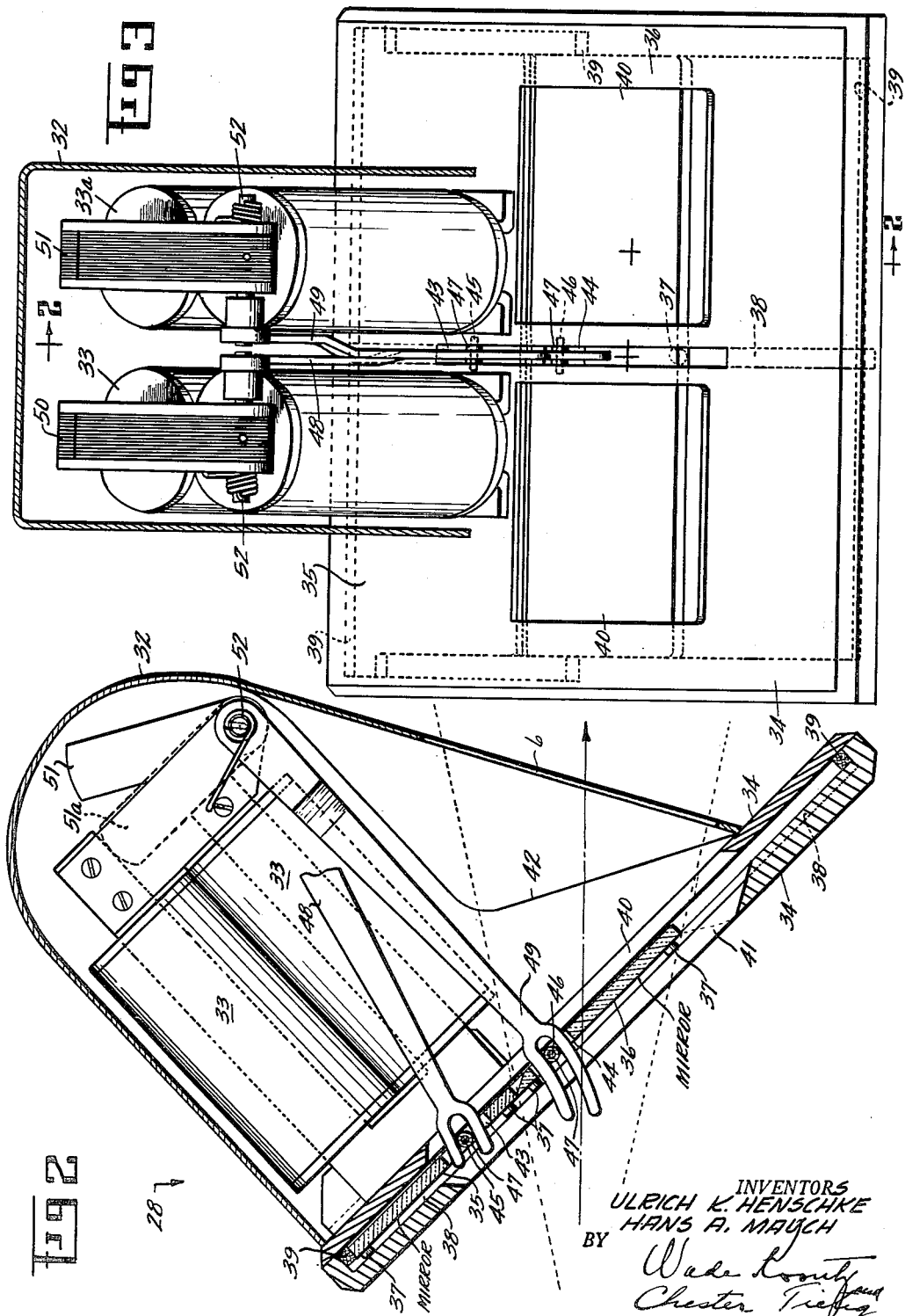
INVENTORS
ULRICH K. HENSCHKE
HANS A. MAUCH
BY
ATTORNEYS

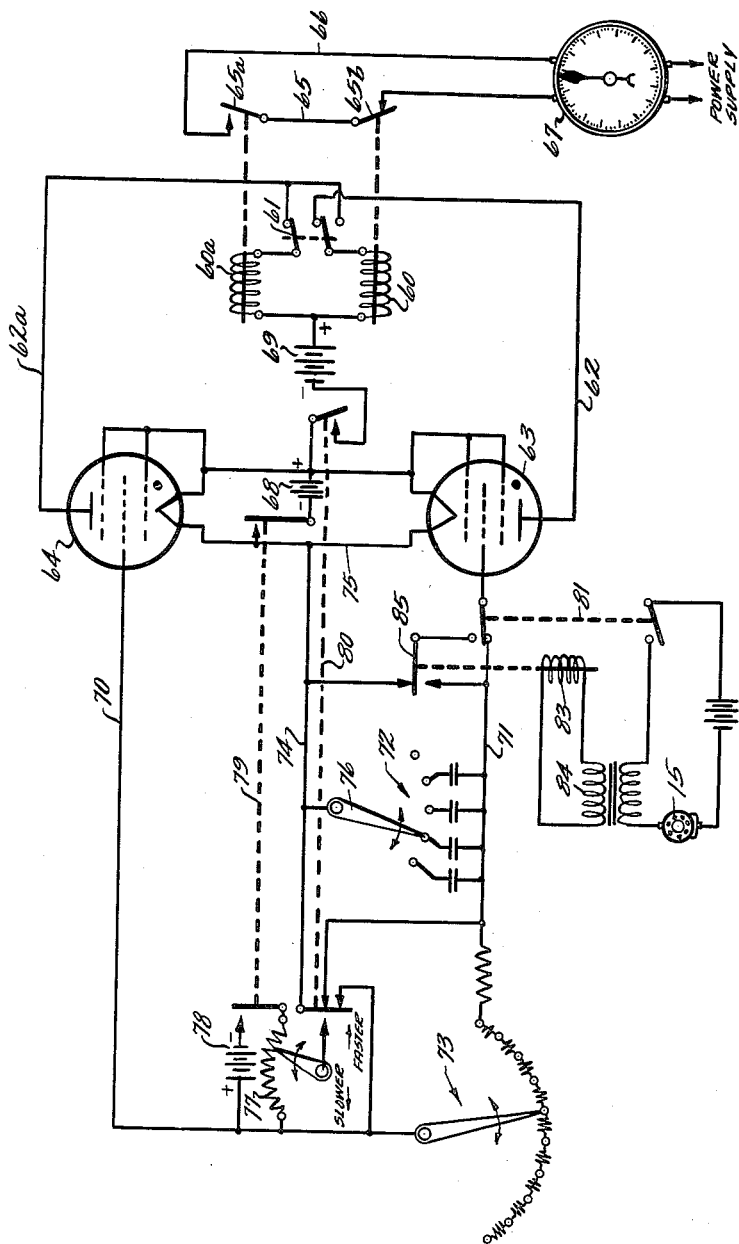

Patented Mar. 25, 1952

2,590,101

UNITED STATES PATENT OFFICE 2,590,101

TACHISTOSCOPE

Ulrich K. Henschke, Garmisch-Partenkirchen, and Hans A. Mauch, Rottweil-on-the-Neckar, Germany Application April 18, 1949, Serial No. 88,202

4 Claims. (Cl. 88—20)

(Granted under the act of March 3, 1883, as amended April 30, 1928; 370 O. G. 757)

The invention described herein may be manufactured and used by or for the Government for governmental purposes without payment to us of any royalty thereon.

This invention relates to a device, which is useful for testing the effectiveness of visual displays such as printed matter, instrument dials, signs, advertisements, in respect to their readability, interpretability, or eye-catching qualities; or if a display of known effectiveness is used, the visual abilities of various subjects such as contrast threshold, visual acuity, depth perception, color vision, eye movements, accommodation, convergence and adaptation as well as certain other qualities such as reading skill, ability of interpretation, attention and fatigue may be accurately rated for purposes of selection, training or research.

In a great number of visual studies, a display must be presented to a subject for an accurately controlled period of time. Testing devices which provide facilities for this purpose are commonly called "Tachistoscopes" (Greek for "rapid viewer"), because the application of a special device becomes particularly necessary for short periods of time.

The presentation of a visual display for short periods of time may appear easily possible by placing before the subject's eyes a photographic shutter commercially available for opening times down to $1/1000$ second. In this arrangement, however, the eyes of the subject have an undefined viewing direction, accommodation, convergence and adaptation in the moment of the opening of the shutter. The results, therefore, would be rather unreliable, particularly for short opening times of the shutter, because all or at least a substantial part of the time, during which the shutter stays open, would be required to adjust the subject's viewing direction, accommodation, convergence and adaptation to the desired values.

Thus, a tachistoscope, besides the presentation of a visual display for short times, should also make it possible to define the viewing direction, the accommodation, the convergence and the adaptation of the subject's eyes to any desired value. This psychologists tried to accomplish in various laboratory arrangements; however, no satisfactory solution appropriate for universal application in visual research was accomplished.

In this invention, a new principle is applied, which makes it possible to present to the subject visual displays for any periods of time with any desired pre-setting of the subject's viewing direction, accommodation, convergence and adaptation; and which is thus suitable for the design of tachistoscopes to be used as standard testing devices in all kinds of visual investigations. Its essential feature is the use of a shutter, the moving parts of which are mirrors or are provided with mirrors, on the side directed toward the subject. If glass or other transparent materials are used for the moving parts, it is preferable to have the mirror surface on that side of the transparent material which is directed toward the subject. This "mirror shutter" is arranged under a certain angle, preferably about 45°, close to the subject's eyes. Thus with the shutter closed, the subject's eyes can be pre-directed, pre-accommodated, pre-converged and pre-adapted by looking by means of the mirror surface of the shutter at a fiducial mark arranged in the desired virtual direction and in the desired optical distance and illuminated with the desired brightness and color.

This principle can be applied in the design of tachistoscopes and similar arangements in various ways and those devices can be used in numerous modifications according to the different needs of the particular experiment; and they can be combined with additional devices such as timers and special relays which may be desired in visual investigations.

A further difficulty in the design of tachistoscopes lies in the fact that a usual shutter arranged between eye and display does not expose the different spatial elements of the display to the optically corresponding perceptual elements of the retina for exactly the same period of time, usually the central perceptual elements are exposed longer than the peripheral perceptual elements of the retina.

This difficulty is overcome in this invention by application of the following new principle: The moving parts of the shutter are two sliders moved independently by dynamically identical mechanisms. By moving the first slider, the shutter is opened; by moving the second slider to the original place of the first slider, the shutter is closed again. After the experiment, both sliders are returned to their original positions. Due to the independent movement of each slider and due to their identical kinetic behavior, each of the different spatial elements of the display is presented to the optically corresponding perceptual elements of the retina for exactly the same period of time.

It is thus, the primary object of this invention to provide means for pre-setting the subject's viewing direction, accommodation, convergence and adaptation prior to the presentation of a visual display by using a shutter before the subject's eye, the moving parts of which are mirrors on the side directed toward the subject, and which thus, in the closed position makes possible the observation of a fiducial mark and in the opened position the observation of a visual display, or vice-versa.

Another object is to provide means for presenting the different spatial elements of a display to the optically corresponding elements of the retina for exactly the same period of time by using a shutter, the moving parts of which are two sliders moved independently one after the other by dynamically identical mechanisms.

A further object is to provide means for closing the shutter after a pre-set opening period by dynamically identical mechanisms.

Still another object is to provide for a modification of the invention whereby the shutter is closed by the voice of the subject by use of a microphone relay.

Still another object is to provide for a modification of the invention whereby a number of subjects may be tested at once by means of successive projection of the display and of the fiducial mark on a screen.

Without attempting to enumerate at this point all the various objects and advantages of our invention, we shall proceed with the detailed description thereof in which other and additional objects and advantages will be pointed out or else will be apparent from such description.

In order that our invention may be readily understood and its practical advantages fully appreciated, reference should be had to the accompanying drawings in which we have illustrated one form of embodiment thereof. However, it will be understood that our invention is susceptible of embodiment in other forms of construction than that which is shown in the drawings and that changes in the details of construction may be made within the scope of the claims without departing from our invention.

In the drawings:

Fig. 1 is a side elevation of the tachistoscope mounted upon a table, the subject under test being shown in dotted line wearing a throat microphone, Fig. 2 is a side elevation, partly in section, of the shutter, the section being taken on the line 2—2 of the following figure, Fig. 3 is a rear elevation of the shutter, part of the upper case being shown in section, Fig. 4 is a schematic diagram of a timing circuit suitable for use with the instrument. It incorporates a microphone which may, for some purposes, be omitted, and Fig. 5 is a schematic representation, in side elevation of a modification of the tachistoscope to adapt it for the simultaneous testing of a number of subjects. It employs two projectors.

In Fig. 1, 10 is the tachistoscope which is mounted on a table 11 at one edge thereof by a clamp 12. A subject 13 preferably sits on an adjustable stool. He wears a throat microphone 15, which will be later referred to. The tachistoscope 10 comprises a column 14, near the top of which an angled bar 16 projects upwardly from a sleeve 17, movable on the column 14 and fixable by a screw 9. In vertical alignment with column 14, there is a chin rest 18 by which the subject's chin is positioned, the rest 18 being swivelled on an adjusting screw 19 for vertical adjustment. At the top of the bar 16, a forehead-positioning pad 20 is provided. It may be made adjustable.

Between the clamp 12 and the sleeve 17 a movable arm 21 is arranged on column 14 by a sleeve 22. It is fixable by a screw 8. The arm 21 bears a mirror 23 on its outer end, the mirror 23 being swivel-mounted in a ball and socket joint 24. The latter is fixable by a screw 7. Parallel with column 14, there is mounted vertically on table 11 a panel 25 which may bear a fiducial mark 26, or other exhibits to be tested, it being arranged to be reflected upward by the mirror 23 along dashed lines 27a and 27b.

Near the top of bar 16 there is angularly mounted a shutter 28 which is shown in detail in Figs. 2 and 3. A panel 29 which bears a visual display 30, or other exhibits, is supported vertically on the table 11 so as to be observable by the subject on line 31. The length of the combined lines 27a and 27b is intended to equal the length of line 31. Furthermore, for special studies of accommodation and convergence, the length of line 31 may be increased to panel 29a, for example, or decreased.

Referring now to Figs. 2 and 3, the shutter 28 comprises a curved metal housing 32 for a relay 33 and 33a which is attached to a flat housing 34 for the sliders, namely an upper slider 35 and a lower one 36. These are mirrors, preferably coated on their subject side (in Fig. 2 their left hand side). The slider 36 must cover the shutter opening (between the dashed lines) completely, when it is in its upper position and slider 35 must cover it, when it is in its lower position. Where the lower slider 36 touches the upper slider 35, the upper edge of 36 is beveled so that the touching edge does not disturb the observation when the shutter opens. Sliders 35 and 36 are held in their proper channels by guides 37. The guides 37 are positioned in a groove 38, only one guide being shown in Fig. 3. Felt strips 39 serve as shock absorbers and silencers within the housing 34 at the limits of the travel of the respective sliders. Openings 40 and 41 are provided, respectively, in the inner and outer walls of the housing 34 so that the observer may see through them when the lower slider 36 is moved in its lower position. 6 is the necessary opening in housing 32.

For the purpose of actuating the sliders 35 and 36, each of the sliders has an opening 43 and 44, respectively, located on the middle dividing line of each slider. Across each of these openings are pins 45 and 46, respectively, each pin being provided with a roller 47.

Movement of the sliders is accomplished by relay-actuated forks 48 and 49 for sliders 35 and 36, respectively. Fork 48 is straight and is shorter than fork 49, while fork 49 is provided with circularly curved lines having pins 45 as their center. The purpose of the latter is to move both rollers and sliders with identical kinetic properties of motion. Fork 48 as may be seen in Fig. 3 is connected to an armature 50 of relay 33 while fork 49 is connected to an armature 51 of relay 33a. 51a shows in dotted lines the armature 51 of the relay 33a in the attracted position. The poles of the relay have a special shape to equalize the attraction force over the whole travel of the armature as well as possible. The armatures and the cores are laminated. Each relay has a return spring 52, which brings the relay and, therefore, the corresponding slider back to the original resting position, if the relay is switched off. Each relay has, furthermore, a doublethrow contact (not shown), which can be used for calibration and scoring.

In order to move both sliders in the same kinetic manner, both systems, comprising relay, fork and slider should have as nearly identical mechanical and electrical properties as possible.

Referring now to Fig. 4, a timing circuit is schematically illustrated. In practice, the components of this circuit would be contained in a box, preferably resting upon the table 11, but such box has not been shown because it is not necessary to illustrate it. The microphone 15 would of course be connected to the box by wires, which it is also unnecessary to illustrate.

In Fig. 4, 60 and 60a are respectively the coils of the relays 33 and 33a shown in Fig. 2. Each relay has two coils, as may be seen from Fig. 2, although only one is shown per relay in Fig. 4. The purpose of the double coils is to provide more positive action by providing more power.

A double throw reversible switch 61 is provided for manual operation optionally to connect one coil 60 or 60a with a plate circuit 62 or 62a of a pair of thyratron tubes 63 and 64, respectively. The purpose of the arrangement is to test for identity of dynamic behavior of the relay systems, which, as previously stated, should be identical.

A switching device 65 is arranged to be actuated by the coils 60 and 60a to control a circuit 66 of an electric timer 67. When the coil 60a is actuated, a contact 65a of the switch 65 is closed, thereby setting the timer 67 in operation. When the coil 60 is operated, the other contact 65b of the switching device 65 is opened, thereby stopping the timer. The electric timer 67 is of a type in which closing of the circuit 66 actuates a clutch (not shown) which couples the hand of the timer to a motor (not shown) which has been in continuous operation. Model S-1 (1 R. P. S. speed) of the Standard Electric Time Company is suitable.

The thyratrons 63 and 64 are both of the type JAN-CRC-2050 VT-245 V3E SC 278 A. The filaments are heated in common by a battery 68 and plate voltage is supplied also to both thyratrons by a second battery 69, also connected through the relay coils 60 and 60a.

The control grids of the thyratrons 63 and 64 are included in a circuit which comprises leads 70 and 71. One of four graduated-capacity condensers 72 (for instance of 1, 10, 100 and 1000 microfarads) is connected between leads 74 and 71 by an adjustable tap 76; or the tap 76 may be set at a zero position. A variable resistance 73 (for instance variable between 1000 and 10,000 ohms) is connected in series with leads 74 and 71. The lead 74 connects the control grid circuits 70—71 to a filament circuit 75. Grid voltage for the thyratrons is provided by a battery 78 and regulated by a potentiometer 77. The purpose of the resistance-condenser arrangement is to delay in an adjustable manner the application of the firing voltage to the grid of thyratron 63. The delay time in seconds shall be equal to the product of the microfarad value of that condenser on which the tap 76 is set and of the ohm value on which the tap of variable resistance 73 has been set, divided by 1,000,000. The smallest pre-settable time value is, therefore, 1/1000 second and the largest 10 seconds. When the tap 76 is set on the zero position, both thyratrons will fire at the same time, i. e. giving no delay time whatever.

A double main switch 79 is provided to connect batteries 68 and 78 into the circuit. An auxiliary push-button double switch 80, operable by the person in control of the experiment, is arranged to connect simultaneously battery 69 into the plate circuit and lead 74 to the tap of the potentiometer 77.

If microphonic control by the subject's voice is desired, a third switch 81 must be closed upwards. Thus, a throat or other type microphone 15, preferably of carbon type SW109-T-17, is connected to a relay 83 through transformer 84, and the connection between lead 71 and the grid of thyratron 63 is interrupted. The function of transformer 84 is to prevent direct current from entering the relay circuit. The relay 83 controls still another switch 85 in lead 71. By closing switch 85 to downward, lead 71 is again connected with the control grid of thyratron 63.

OPERATION OF THE TACHISTOSCOPE (a) Calibration

Switch 79 is closed to the left. This applies current from battery 68 to the heating filaments of thyratrons 63 and 64, and at the same time the voltage of the battery 78 is applied to the potentiometer 77. Then the switch 61 is closed to the upper position and the switch 81 to the lower position as shown in Fig. 4. Adjustable tap 76 is set at its zero position. The variable resistance 73 may be set on 1000 ohms. The tap of potentiometer 77 is set to a position; whereby the potentiometer voltage is higher than the voltage required at the grid of both thyratrons for their firing. By these settings, the same voltage is applied to the grid of both thyratrons at the same time. Thus, as soon as the experimenter operates the push-button 80, thereby applying the grid voltage to leads 70 and 71, both thyratrons 63 and 64 fire simultaneously. The coil 60a of the relay 33a is actuated by the firing of the thyratron 64 thereby moving the lower slider 36. In the same way the firing of thyratron 63 actuates the coil 60 of the relay 33 and moves the upper slider 35.

Since both thyratrons fire at the same time, both the upper and lower slider should also start moving at the same time. If both thyratrons, relay- and slider-systems have identical kinetic behavior, no opening will be visible. Whether or not this is the case can be easily ascertained by looking through the shutter in the direction of the arrow in Fig. 2 while placing a strong source of light behind the shutter. In case any opening is visible, it indicates that thyratron 63, the relay 33 or slider 35 is not working properly. The experimenter now releases the push-button 80, thereby interrupting the plate circuit and shortcircuiting the grids of both thyratrons to their filaments. By means of the return springs 52, the two sliders are then brought back into their original positions.

The reversible switch 61 is now put into the lower position and the same experiment is repeated. In this case also, there should be no opening visible during the movements of the sliders. If there is any opening visible, it indicates that thyratron 64 controlling in this case the relay 33 and slider 35 is not working properly.

In preparing for the next step of calibration a suitable delay time is pre-set by adjusting the position of tap 76 and variable resistance 73. The delay time, for the purpose of calibration, should be great enough to be measured accurately by the timer 67. For example, a value of five seconds may be chosen by setting the variable resistance 73 on 5,000 ohms and connecting the tap 76 with the condenser of 1,000 microfarads. The double reversible switch 61 has to be set again in the upper position while switches 81 and 79 remain in the same position during the whole process of calibration. The experimenter now presses the push-button 80, whereupon the grid voltage is applied immediately to thyratron 64 which, by its firing, actuates coil 60a, which in turn moves the lower slider 36. Thyratron 63, however, does not fire immediately, because the voltage of the potentiometer 77 is not immediately supplied to the control grid of thyratron 63; at first, the condenser 72 has to be charged. The time which is needed to charge the condenser to the firing voltage of the thyratron 63 depends upon the value of the resistance 73 and of the condensers 72 as stated above. After the firing voltage is reached on the grid of the thyratron 63, the thyratron 63 fires, thus energizing coil 60 which in turn moves the upper slider 35.

Energization of the coil 60a closes the contact 65a, thus starting the timer 67. Energization of the coil 60 opens the switch 65b, thus stopping the timer 67. Since the setting of the variable resistance 73 and adjustable tap 76 was adjusted to give a time of five seconds, the time indicated by the timer should be also five seconds. If the indicated time is more than five seconds, then the knob of the potentiometer 77 has to be adjusted in the direction of the arrow "faster" in Fig. 4. If the indicated time is shorter than five seconds, then the adjustment must be carried out by moving the potentiometer 77 in the direction of the arrow "slower." This kind of adjustment thus is similar to the regulation of an ordinary clock. Adjustment must be repeated until the timer indicates five seconds with sufficient accuracy.

After each firing of the second thyratron 63, the experimenter releases the push-button 80. It may be noted that hereby the condenser is discharged through the right hand contacts of switch 89. These contacts are adjusted in such a manner that the lower contact engages first so that the condenser is discharged at first through the resistance. Sparks which may be formed if the condenser would be discharged by the upper contact engaging first, are thus avoided.

*(b) Conducting experiments, wherein the shutter is closed after a pre-selected time*

The functioning of this instrument will be described in an experiment wherein a visible display, for instance a certain dial shall be presented to the subject for a pre-selected time. The subject is placed as shown in Fig. 1. He observes by means of the mirror surface of the lower slider 36 and of the mirror 23 a fiducial mark 26 which is placed in the same direction and in the same distance and is illuminated in the same way as the dial 30. The subject is told to view the fiducial mark and to try to recognize a special feature of the visual display, for instance the position of a pointer on the dial as closely as possible during the time the shutter is opened. The experimenter, in the meantime, has closed the main switch 79 to the left position and has ascertained that the switch 61 is in the upper position and the switch 81 in the lower position. In addition, he has pre-selected the desired opening time of the shutter. If, for example, he desires an opening time of $1/100$ of a second, he sets the variable resistance 73 on 1,000 ohms and the adjustable tap 76 on 10 microfarads.

Having done this he notifies the subject that the shutter will open shortly and he then actuates the push-button 80, keeping his finger thereon. As described in the case of calibration, the lower slider 36 starts moving downward immediately, thus opening the shutter and giving the subject a direct view at the display 30; and the upper slider starts moving $1/100$ of a second later, thereby closing the shutter and again giving the subject a view of the fiducial mark. Due to the independent movement of each slider and due to their identical kinetic behavior, each of the different spatial elements of the visual display is presented to the optically corresponding perceptual elements of the retina for exactly the same period of time. The subject now states the meaning of the visual display, for instance the position of the pointer which he has observed. The experimenter by releasing the push-button 80 returns the sliders by means of the springs 52 to their original positions and the apparatus thus is ready for a new test.

*(c) Conducting experiments, wherein the shutter is closed by the subject's voice*

The use of a tachistoscope will now be discussed for a modified kind of operation wherein the shutter is not closed after a pre-set time, but only after the subject thinks that he has comprehended the meaning of the display. Such measurements are important for the estimation of the so-called "comprehension time." The mechanical arrangement is the same as described previously, except that switch 81 is in the upper position and that the subject is provided with a microphone 15. The subject is told to call out the meaning of the visual display, for instance the position of the pointer on the dial, as quickly as possible after the presentation of this display. By the positions of the variable resistance 73 and of the variable adjustable tap 76, a delay time of about $1/10$ of a second is chosen for reasons which will be later explained. When the experimenter actuates the push-button 80, the lower slider 36 moves, thus giving the subject a direct view of the visual display 30. The subject's eyes are pre-set in the correct direction, accommodation, convergence and adaptation by the previous fixation upon the fiducial mark. According to his instructions, the subject calls out the recognized value as soon as possible. His voice energizes the microphone 15, which in turn, by means of the transformer 84, energizes the relay 83 and simultaneously prevents flow of direct current into the relay circuit. The contact 85 is thereby closed into its lower position, thus connecting the lead 71 with the control grid of thyratron 63. The thyratron 63 thereupon fires immediately, thus closing the shutter by moving the upper slider 35. The time which has elapsed between the movement of the lower and upper sliders will be indicated in the manner described above by the timer 67. This time is consequently the time which has elapsed between the presentation of the display 30 and the speaking of the subject. It is known as "comprehension time" and is always longer than .15 second. For this reason the previously described setting of the variable resistance 73 and of the adjustable tap 76 to a delay of about .1 second does not interfere with the measurement of the "comprehension time." Such a time delay, however, prevents the firing of thyratron 63 by any noise which may arise from the movement of the lower slider 36. The experimenter releases the push-button 80 and the tachistoscope is thus in the way described above ready for a new experiment.

With slight modifications, an arrangement as shown in Figs. 1–4 can be used for a great variety of visual investigations. The examples may be described in order to point out some possible variations.

The first example concerns the comparison of two very similar displays, such as banknotes, special patterns or colors for a same-different judgment. In this case, the first display is set up in the position shown in Fig. 1 for the display 30; and the second similar display is set up in the position in which the fiducial mark 26 is shown in Fig. 1. Both displays are adjusted as good as possible to the same virtual direction, the same optical distance from the eyes, and the same illumination. The subject is told to look at the second display by means of the mirror surfaces of the closed shutter. Then the shutter is opened. If both displays are exactly alike, the subject will notice no change in the display, when the shutter is opened. If there are differences, the subject will notice some changes. Since both displays can be easily presented alternately by closing and opening the shutter and since they are compared with the same retina elements without any eye movements or changes of accommodation, convergence and adaptation much slighter differences become obvious than by the usual comparison, wherein two displays have to be placed side by side and can be compared only after the eye has moved.

The second example for a variation of the arrangement shown in Fig. 1 concerns the investigations of the influence of blinding lights on the visual abilities of the subject. In this case, a suitable test chart for the measuring of some of the subject's visual abilities, for instance a chart with letters and numerals of different sizes as widely used by optometrists, is placed on the panel 25 instead of the fiducial mark 26 (Fig. 1). One or several blinding lights are then placed on the panel 29 instead of the display 30. They blind the subject for the time during which the shutter stays open. Since this time can be controlled accurately it is easily possible to study the influence of the duration of the blinding on the visual abilities. Furthermore, by placing the blinding lights in various directions and distances, investigation with blinding different areas of the retina can be carried out.

Referring more particularly to Fig. 5, there is shown a modification of the application of the device for the simultaneous testing of a number of subjects. A first projector 86 projects by means of the mirror surfaces of the closed shutter 28, described in connection with Figs. 1–4, a fiducial mark from a slide (not shown) on a screen 87. The second projector 88 arranged at a 90° angle to the projector 86 projects the display to be tested for the time during which the shutter 28 is opened. In this way, the experiment described under "(b) Conducting experiments, wherein the shutter is closed after a pre-selected time" in connection with Figs. 1–4 can be conducted with a large number of subjects simultaneously. They may each be provided with a scoring card upon which they put down their results; for example, the position of the pointers on the dials observed. By comparing these results with the actual position of the pointer or pointers, the readability of various kinds of dials may be accurately determined, or conversely the speed and accuracy of the subject's reactions.

While many changes and modifications may be made without departing from the spirit and scope of this invention, we desire to be limited only by the scope of the appended claims.

What we claim is:

1. In a tachistoscope, a first display, a second display, shutter means comprising movable reflecting means shiftable to two positions whereby to bring alternately into view the first display and the second display, said shutter means being positioned substantially at a point from which both displays are observable, electromagnetic means connected with said shutter means for controlling the shifting of said shutter means and timing means connected to the shutter means for controlling the period during which the second display is presented, an interval timer electrically connected to the timing means for indicating the duration of the time interval during which the second display is presented, whereby the time of observation may be determined.

2. In a tachistoscope, means for establishing a standard position for a subject, a shutter housing inclined at substantiatlly 45° to the subject's line of vision when he is in standard position, a first display, a pair of sliders in said housing, the first of which has a mirrored front surface, said housing having an opening behind the sliders, the first of said sliders covering said opening completely when it is in its lower position and the lower of said sliders covering the opening when it is in its upper position, pins on the sides of each slider, forks engaging a respective pin on the sides of the sliders, a solenoid for actuating the forks on each slider, electrical means for actuating said solenoids whereby to move the first slider in a straight line across the opening to expose the first display to the subject and then after an interval predetermined by the experimenter, to move the second slider through substantially the same path across the same opening whereby to cut off the subject's view of the second display, said electrical means comprising a control circuit for said solenoids, including a bank of condensers of graduated capacities, means for selecting one condenser from said bank of condensers to be charged, a variable resistance, means for charging the selected condenser through said variable resistance, a first thyratron having a plate circuit, said plate circuit including the first solenoid so that the firing of said thyratron will energize the first solenoid to open the shutter, a second thyratron having a grid circuit arranged to fire when the charge of the selected condenser reaches the required firing voltage at the grid of the second thyratron, said thyratron being arranged to energize said second solenoid upon firing whereby to close said shutter, and an interval timer arranged in parallel with power means energizing the electrical means to indicate the elapsed time between the firing of the two thyratrons.

3. In a tachistoscope according to claim 2, a secondary circuit in the electrical means, said secondary circuit including a microphone, a source of power for said microphone, a transformer and a relay arranged to fire said second thyratron upon reception of the subject's voice by said microphone.

4. In a tachistoscope, a display, a shutter positioned to block in closed position the view of said display, said shutter having two sliders, a shutter housing inclined at substantially 45° to the subject's line of vision when he is in standard position, a mirrored front surface for the first of the two sliders, said housing having an opening behind the sliders, the first of said sliders covering said opening completely when it is in its lower position and the lower of said sliders covering the opening when it is in its lower position, means for moving said sliders to open the aperture independently one after the other in the same direction in a dynamically identical manner, said means comprising pins on the sides of each slider, forks each engaging a respective pin, a solenoid for actuating said forks, electrical means under the control of an experimenter for actuating said solenoid whereby to move the first slider in a straight line across the opening to expose a display to the subject and then after a predetermined interval to move the second slider through substantially the same path across the same opening whereby to cut off the subject's view of said display and means for returning both sliders together in the opposite direction to their original positions.

ULRICH K. HENSCHKE.
HANS A. MAUCH.

REFERENCES CITED

The following references are of record in the file of this patent:

UNITED STATES PATENTS

| Number | Name | Date |
|---|---|---|
| 540,545 | Gray | June 4, 1895 |
| 1,467,466 | Willard | Sept. 11, 1923 |
| 1,508,169 | Doane | Sept. 9, 1924 |
| 1,526,781 | Ferree et al. | Feb. 17, 1925 |
| 1,920,428 | Pank | Aug. 1, 1933 |
| 1,981,587 | Dorsey | Nov. 20, 1934 |
| 2,087,235 | Ames et al. | July 20, 1937 |
| 2,166,947 | Fayerweather | July 25, 1939 |
| 2,239,164 | Wigelsworth | Apr. 22, 1941 |
| 2,246,001 | Powers | June 17, 1941 |
| 2,311,914 | Tiffin et al. | Feb. 23, 1943 |
| 2,400,778 | Osborne | May 21, 1946 |
| 2,410,237 | Renshaw | Oct. 29, 1946 |
| 2,412,092 | Mayle | Dec. 3, 1946 |
| 2,439,330 | Zander | Apr. 6, 1948 |
| 2,448,736 | Rabinowitz | Sept. 7, 1948 |
| 2,453,486 | Ball | Nov. 9, 1948 |
| 2,460,350 | Hinman | Feb. 1, 1949 |
| 2,495,708 | Draeger et al. | Jan. 31, 1950 |

OTHER REFERENCES

Helmholtz, Physiological Optics, Translated by Southall, vol. III, 1925, page 197, published by the Optical Society of America. (Copy of volume in Division 7.)